(12) United States Patent
Omaru et al.

(10) Patent No.: US 6,686,094 B2
(45) Date of Patent: *Feb. 3, 2004

(54) NON-ACQUEOUS ELECTROLYTE SECONDARY CELL

(75) Inventors: Atsuo Omaru, Fukushima (JP); Naoyuki Nakajima, Fukushima (JP); Masayuki Nagamine, Fukushima (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 358 days.

(21) Appl. No.: 09/043,634

(22) PCT Filed: Jul. 30, 1997

(86) PCT No.: PCT/JP97/02652
§ 371 (c)(1),
(2), (4) Date: Jul. 24, 1998

(87) PCT Pub. No.: WO98/05083
PCT Pub. Date: Feb. 5, 1998

(65) Prior Publication Data
US 2001/0014422 A1 Aug. 16, 2001

(30) Foreign Application Priority Data
Jul. 30, 1996 (JP) .......................................... P8/200304

(51) Int. Cl.$^7$ .................................................. H01M 4/62
(52) U.S. Cl. .................. 429/232; 429/231.8; 429/231.1
(58) Field of Search ................................. 429/232, 231.8, 429/231.1

(56) References Cited

U.S. PATENT DOCUMENTS

| | | | | |
|---|---|---|---|---|
| 5,238,760 A | * | 8/1993 | Takahashi et al. | |
| 5,340,670 A | * | 8/1994 | Takami et al. | |
| 5,686,138 A | * | 11/1997 | Fujimoto et al. | 429/197 |
| 5,686,203 A | * | 11/1997 | Idota et al. | 429/342 |
| 5,691,084 A | * | 11/1997 | Kita et al. | 429/194 |
| 5,718,989 A | * | 2/1998 | Aoki et al. | 429/218 |

FOREIGN PATENT DOCUMENTS

| | | | | |
|---|---|---|---|---|
| EP | 0 567 149 A1 | | 10/1993 | |
| EP | 0 594 965 A1 | | 5/1994 | |
| EP | 0 651 450 A1 | | 5/1995 | |
| EP | 0 671 774 A1 | | 9/1995 | |
| EP | 0 704 921 A1 | | 4/1996 | |
| EP | 0704921 | * | 4/1996 | H01M/10/40 |
| JP | 58189963 | * | 11/1983 | H01M/4/62 |
| JP | 01 294356 A | | 11/1989 | |
| JP | 05325974 | * | 12/1993 | H01M/4/02 |
| JP | 8-195201 A | | 7/1996 | |

* cited by examiner

Primary Examiner—Patrick Ryan
Assistant Examiner—Tracy Dove
(74) Attorney, Agent, or Firm—Bell, Boyd & Lloyd LLC (57) ABSTRACT

In a non-aqueous electrolyte secondary battery including an anode and a cathode consisting of material capable of doping/undoping of lithium, and non-aqueous electrolytic solution in which electrolyte is dissolved in a non-aqueous solvent, flaky graphite having high crystallinity and high electron conductivity is added as conductive agent into the anode and the cathode. Further, granulated carbon and carbon black having specific material property is added as conductive agent in addition to the flaky graphite. Thus, non-aqueous electrolyte secondary battery having long cycle life time and high reliability can be obtained.

6 Claims, 4 Drawing Sheets

NON-ACQUEOUS ELECTROLYTE SECONDARY CELL

TECHNICAL FIELD

This invention relates to improvements in the cycle characteristic of charge/discharge of a non-aqueous electrolyte secondary battery.

BACKGROUND ART

Recent electronic technologies have conspicuously progressed so that, e.g., miniaturization and/or light weight of electronic equipments can be realized in succession. Followed by this, also for batteries as portable power supply (source), there has been still more increased demand of miniaturization, light weight and high energy density.

Hitherto, as the secondary battery of general use, aqueous solution system batteries such as lead battery, or nickel/cadmium battery, etc. were the main current. These batteries can be satisfied to some extent in the cycle characteristic, but it cannot be said that they have satisfactory characteristic in points of battery weight and the energy density.

On the other hand, studies/developments of non-aqueous electrolyte secondary batteries using lithium or lithium alloy as anode have been extensively carried out in recent years. Such batteries have excellent characteristics of high energy density, small self-discharge and light weight by using, as cathode material, Li contained composite oxide represented by $LiCoO_2$ of high discharge voltage.

However, in non-aqueous electrolyte secondary batteries using, as anode, lithium or lithium alloy, lithium is crystal-grown in dendrite form at the time of charging followed by development (progress) of the charge/discharge cycle and reaches the cathode so that there results the internal short. In addition, since there results production of dendrite, practical quick charge cannot be carried out. For these drawbacks, realization of practical use became difficult.

As a battery which solves such problem, non-aqueous electrolyte secondary batteries using carbon material as the anode, which are so called lithium ion secondary battery, have been remarked. The lithium ion secondary battery utilizes doping/undoping of lithium into portion between carbon layers as the anode reaction. Even if charge/discharge cycle is developed, precipitation of crystal in dendrite form cannot be observed at the time of charging. Thus, such batteries exhibit satisfactory charge/discharge cycle characteristic.

Meanwhile, there are several carbon materials which can be used as the anode. The material which was first put into practical use is coke or carbon in glass form. These carbon materials are material having low crystallinity obtained by allowing organic material to undergo heat-treatment at relatively low temperature, and has been commercialized as practical battery by using electrolytic solution mainly consisting of propylene carbon (PC). Further, in recent years, when propylene carbon (PC) is used as main solvent, graphite or the like which cannot be used as anode has reached usable level by using electrolytic solution mainly consisting of ethylene carbon (EC).

As the graphite or the like, flaky graphite (the flake of graphite such like a fish) can be relatively easily obtained. Hitherto, such graphite or the like has been widely used as conductive material for alkali battery. This graphite or the like has advantageously high crystallinity and high true density as compared to non-graphitaizable carbon material. Accordingly, if the anode is constituted by the graphite or the like, high electrode filling (packing) ability can be obtained and the energy density of the battery is caused to be high. From this fact, it can be said that the graphite or the like is greatly expected material as the anode material.

On the other hand, in non-aqueous electrolyte secondary batteries using the carbon material as the anode, material which can be used as its cathode material is Li contained composite oxide represented by $LiCoO_2$.

However, in Li contained composite oxide, unit crystalline lattice was caused to undergo expansion/contraction at the time of charge/discharge operation such that change takes place in the electrode thickness by about 10% at the maximum. Further, also in carbon material used for the anode, the crystalline lattice is expanded by about 10% at the maximum. For this reason, expansion/contraction takes place in the both cathode and anode electrodes every time the charge/discharge cycle is repeated. For this reason, stress is repeatedly applied to the electrode, so the electrode is apt to be broken. Particularly, in the cathode in which the conductivity of the active material itself is low, electron conducting ability (conduction) is lost by breakage. As a result, deterioration becomes conspicuous. In addition, also in the anode mainly containing metal oxide, there exists similar problems. Therefore, their improvements have been required.

DISCLOSURE OF THE INVENTION

This invention contemplates realizing cathode/anode structure difficult to be broken even if charge/discharge cycle is repeatedly carried out thus to provide a non-aqueous electrolyte secondary battery having long cycle life time and high reliability.

Namely, this invention is directed to a non-aqueous electrolyte secondary battery including anode and cathode consisting of material capable of doping/undoping of lithium, and non-aqueous electrolytic solution in which electrolyte is dissolved in non-aqueous solvent, characterized in that flaky graphite is included as conductive agent in both the anode and the cathode, or in either one of them.

Moreover, this invention is characterized in that granulated carbon having bulk density of 0.5 g/cm³ or more is included, in addition to flaky graphite, as conductive agent.

This invention is characterized in that carbon black is included, in addition to flaky graphite, as conductive agent.

This invention is characterized in that granulated carbon having bulk density of 0.5 g/cm³ or more and carbon black are included, in addition to flaky graphite, as conductive agent.

By allowing the anode and the cathode to include (contain) flaky graphite having high crystallinity and high electron conduction as conductive agent, electrode structure having satisfactory electron conductivity is constituted. Further, by containing granulated carbon having specific material property as conductive agent, granulated carbon holds electrode structure having satisfactory electron conduction. Thus, long charge/discharge cycle life time can be obtained. In addition, by containing carbon black as conductive agent, carbon black functions as electrolytic solution holding material at the active material surface. Thus, longer charge/discharge cycle life time can be obtained.

BEST MODE FOR CARRYING OUT THE INVENTION

An embodiment of this invention will now be described in detail with reference to the attached drawings.

This invention is directed to a non-aqueous electrolyte secondary battery including anode and cathode consisting of material capable of carrying out doping/undoping of lithium, and non-aqueous electrolytic solution in which electrolyte is dissolved in non-aqueous solvent, characterized in that flaky graphite is added as conductive agent into both the cathode and the anode, or one of them. Further, this invention is characterized in that granulated carbon or carbon black is added, in addition to flaky graphite, as conductive agent.

The flaky graphite used as conductive agent of this invention may be either natural graphite or artificial graphite obtained by carbonizing organic material represented by coal or pitch to allow the carbonized organic material to further undergo high temperature treatment.

Most of natural graphite materials are produced as ore. The places of production are China, Madagascar, Ceylon, Mexico and Brazil, etc. In the state of ore, there are many inorganic impurities except for graphite. Particularly, metal element is electrochemically eluted, thus exerting bad influence on the battery. For this reason, it is necessary to dissolve these inorganic impurities into solvent to wash away them. As solvent, there can be used aqueous solution including inorganic acid aqueous solution in which hydrogen fluoride, hydrogen chloride, etc. is included with respect to water, inorganic alkali aqueous solution in which sodium hydroxide, etc. is included, aqueous solution including basic organic material, and organic system solvent.

As pitch in the case of artificial graphite, there are tar or the like obtained by high temperature thermal decomposition such as coal tar, ethylene bottom oil or crude oil, etc., pitch material obtained after undergone operation such as distillation (vacuum distillation, ordinary pressure distillation, steam distillation), thermal condensation polymerization, extraction, or chemical condensation polymerization, etc. In addition to the above, there is also pitch material produced at the time of timber carbonization. Further, polyvinyl chloride resin, polyvinyl acetate, polyvinyl butylarate or 3, 5-dimethyl phenol resin, etc. may be used as the starting material to implement predetermined processing thereto to obtain pitch.

Such coal or pitch exists in liquid state at about 400° C. at the maximum in the course of carbonization to hold such substance at that temperature so that aromatic rings are condensed with each other or are caused to be of polycyclic structure, resulting in the stacked and oriented state. Thereafter, when temperature becomes equal to about 500° C. or more, solid carbon precursor, i.e., semicoke is formed. Such a process is called liquid phase carbonization process and is the typical production process of graphitaizable carbon.

In addition, there can be used, as material, condensed polycyclic carbonized hydrogen compound such as naphthalene, phenanthrene, anthracene, triphenylene, pyrene, perylene, pentaphene, pentacene, etc., derivatives thereof (e.g., carboxylic acid, carboxylic acid anhydride, carboxylic acid imide thereof, etc.), mixture thereof, condensed heterocyclic compound such as acenaphthylene, indole, isoindole, quinoline, isoquinoline, quinoxaline, phthalazine, carbazole, acridine, phenazine, phenanthridine, etc., and derivative thereof.

With the above-mentioned organic material as the starting material, desired graphite material is obtained by carbonizing, e.g., the above-mentioned organic material at 300 to 700° C. in inactive gas flow such as nitrogen, etc. thereafter to calcine the article thus obtained under the condition of temperature elevation speed per minute of 1 to 100° C., arrival temperature of 900 to 1500° C., and holding time of about 0 to 30 hours at the arrival tempeature in inactive gas flow (material which has experienced this process is graphitaizable carbon material) to allow it to undergo heat treatment at 2000° C. or more, preferably at 2500° C. or more. It is a matter of course that carbonization or calcination may be omitted in dependency upon circumstances.

Natural or artificial graphite material is caused to be flaky graphite after undergone crushing/milling. In this case, in order to allow such graphite material to take scale shape, it is necessary that such graphite material is material having high crystallinity. In order to obtain particles of more flate plate, it is preferable that particles are peeled off or separated from the carbon hexagonal net plane surfaces coupled weakly by the Van der Waals force. In addition, in order to obtain electron conductivity sufficient as conductive agent, high crystallinity is required.

Moreover, it is preferable that the above-mentioned flaky graphite used as conductive agent of this invention is such that (002) spacing obtained by the X-ray diffraction method is less than 0.3360 nm. Further, it is preferable that the C-axis crystalline element thickness of the (002) plane is 100 nm or more. In addition, it is preferable for the flaky graphite that the bulk density measured by the method described in JISK-1469 is 0.4 g/cm$^3$ or less and the maximum particle diameter measured by the laser diffraction method is 50 μm or less.

Then, granulated carbon used as conductive agent of this invention is obtained, similarly to the method of making up the above-described flaky graphite, by carbonizing organic material represented by coal or pitch to further carry out crushing/milling of high temperature-treated graphite material.

It is preferable for the granulated carbon that the (002) spacing obtained by the X-ray diffraction method is 0.3360 nm or more and the C-axis crystalline element thickness of the (002) plane is 100 nm or less. In addition, it is preferable for the granulated carbon that the bulk density measured by the method described in JISK-1469 is 0.5 g/cm$^3$ or more.

Moreover, carbon black used as conductive agent of this invention does not consist of single particle, but has the so-called structure aggregation such that respective several particles are three-dimensionally linked together.

According as three-dimensional spreading of the structure aggregation becomes greater, the ability capable of absorbing electrolytic solution is enhanced to more degree.

Namely, it is desirable that bulk density of one structure is lower. It is preferable that bulk density of carbon black is 0.4 g/cm$^3$ or less. It is more preferable that its bulk density is 0.2 g/cm$^3$ or less. The bulk density of carbon black can be measured by the method described in JISK-1469.

According as the grain diameter (size) of carbon black becomes smaller, quantity of existence at the active material surface becomes greater. On the other hand, the electron conductivity as the conductive becomes lower. Accordingly, it is preferable that the grain diameter is 5 to 75 nm, and it is more preferable that the grain diameter is 10 to 40 nm or less.

The carbon black indicating the above-described material property is made up by thermal decomposition of hydro carbon caused to be in gas state or in foggy droplet state. As main material, there are creosote oil, ethylene bottom oil, natural gas or the like, coal, petroleum system heavy oil and acetylene, etc. However, carbon black is not limited to these materials. Even if any organic materials are used, they may be used by thermally decomposing them in gas phase.

The manufacturing method is roughly classified into the incomplete combustion method and the thermal decomposition method. In the incomplete combustion method, there are the oil furnace method, the gas furnace method, the channel method and the lampblack method. Moreover, in the thermal decomposition method, there are the thermal method and the acetylene method. Among them, in the case of the acetylene method, since decomposition reaction of acetylene is exothermic reaction, it is unnecessary to apply heat from the external. However, in the case of methods except for the above, it is necessary to supply heat from the external.

In accordance with this invention, granulated carbon or carbon black is added, in addition to flaky graphite as described above, as conductive agent, thereby making it possible to realize long life time of the charge/discharge cycle.

It is desirable that mixing ratio between respective conductive agents and total quantity of conductive agents added with respect to active cathode material are prescribed in a manner as described below.

It is preferable that mixing ratio between flaky graphite and granulated carbon is 95:5 to 5:95, and it is more preferable that this mixing ratio is 90:10 to 20:80.

It is preferable that mixing ratio between flaky graphite and carbon black is 95:5 to 15:85. It is more preferable that such mixing ratio is 95:5 to 30:70.

Moreover, it is preferable that mixing ratio of carbon black with respect to mixture of flaky graphite and granulated carbon is 99:1 to 70:30, and it is more preferable that this mixing ratio is 96:4 to 75:25.

Further, it is preferable that quantity of addition with respect to electrode mix of total conductive agent is 1.5 to 20% by weight, and it is more preferable that this quantity of addition is 2 to 15% by weight.

The flaky graphite has high electron conductivity. It is considered that when this ratio of flaky graphite becomes higher, the electron conductivity of the electrode is increased. However, its particle strength is weak. It is considered that the electrode strength with respect to expansion/contraction at the time of charge/discharge is increased. Moreover, granulated carbon has great particle strength, and it is considered that when the ratio of granulated carbon becomes higher, electrode strength with respect to expansion/contraction at the time of charge/discharge is decreased. However, it is considered that because electron conductivity is low, the electron conductivity of the electrode is decreased. Further, carbon black has high liquid absorbing property, and it is considered that this carbon black collects electrolytic solution in the vicinity of active material to smooth reaction. However, it is considered that when the ratio of carbon black becomes high, the electrode strength with respect to expansion/contraction at the time of charge/discharge operation is decreased. For the above-described reasons, it is desirable that the mixing ratio between flaky graphite, granulated carbon and carbon black is caused to fall within the above-described range.

In this case, existence of respective conductive agents of this invention can be easily confirmed by the scanning type electron microscope and the element analysis method even if they exist in the electrode.

Anode material used in the non-aqueous electrolyte secondary battery of this invention will now be described.

As anode material of this invention, carbon material and metal oxide which can carry out doping/undoping of lithium can be used.

As the carbon material, there are graphite material, graphitaizable carbon material and non-graphitaizable carbon material.

As the non-graphitaizable carbon material, material having (002) spacing of 0.37 nm or more, having true density less than 1.70 g/cm$^3$, and having no exothermic peak at 700° C. or more in the Differential Thermal Analysis (DTA) in air is suitable. As representative example of this non-graphitaizable carbon material, there is material obtained by baking furan resin consisting of furfuryl alcohol, homopolymer or copolymer of furfural, or copolymerization with other resin to carbonize it.

Production of the non-graphitaizable carbon material will now be described. As organic material serving as the starting material, there may be used conjugate system resin such as phenol resin, acrylic resin, vinyl halide resin, polyimide resin, polyamide imide resin, polyamide resin, polyacetylene or poly (p-phenylene), etc., cellulose and its derivative, or arbitrary organic high molecular compound. In addition, material obtained by introducing functional group including oxygen (so called oxygen bridging) into petroleum pitch having specific H/C atomic ratio also serves as the final non-graphitaizable carbon material as it is in the solid-phase state without fusing in the process of carbonization (400° C. or more) similarly to the above-mentioned furan resin.

As the petrolium pitch, there are tar or the like obtained by high temperature thermal decomposition such as coal tar, ethylene bottom oil or crude oil, etc. and pitch obtained by operation such as distillation (vacuum distillation, ordinary pressure distillation, steam distillation), thermal condensation polymerization, extraction, chemical condensation polymerization, etc. At this time, H/C atomic ratio of the petrolium pitch is important. In order to allow it to be non-graphitaizable carbon, it is necessary to allow this H/C atomic ratio to fall within the range from 0.6 to 0.8.

Although means for introducing functional group including oxygen into these petroleum pitches is not limited, there are used, e.g., the wet method of aqueous solution such as nitric acid, mixed acid, sulfuric acid or hypochlorous acid, etc., the dry method by oxidizing gas (air, oxygen), and reaction by solid reagent such as sulfur, ammonium nitrate, ammonium persulfate or ferric chloride, etc.

Although the oxygen percentage content is not particularly limited, this oxygen percentage content is preferably 3% or more, and is more preferably 5% or more as disclosed in the Japanese Patent Application Laid Open No. 252053/1991 publication. This oxygen percentage content exerts influence on the crystal structure of carbon material finally manufactured. When the oxygen percentage content is caused to fall within this range, there is no exothermic peak at 700° C. or more in the DTA in air flow at the (002) spacing of 0.37 nm or more, thus allowing the anode capacity to be large.

Moreover, compound including, as main component, phosphor, oxygen and carbon, which is disclosed in the Japanese Patent Application Laid Open No. 48184/1990 publication, also indicates material parameters similar to the above-described non-graphitaizable carbon material, and can be therefore used as electrode material of this invention. Further, also in other various organic materials, if they are caused to be non-graphitaizable carbon after undergone solid phase carbonization process by oxygen bridging processing, etc., they can be used. In this case, the processing method for carrying out oxygen bridging is not limited.

In the case of obtaining carbon material by using organic material as described above, it is sufficient to carbonize organic material at, e.g., 300 to 700° C. thereafter to bake it under the condition of temperature elevation speed per minute of 1 to 100° C., arrival temperature of 900 to 1300° C. and hold time of about 0 to 30 hours at the arrival temperature. It is a matter of course that carbonization operation may be omitted in dependency upon situations. The carbon material thus obtained is used as anode material after undergone crushing/milling. This crushing may be carried out at process step before and after carbonization, calcination or high temperature heat treatment, or temperature elevation process.

This invention is advantageous particularly in the battery using graphite material as anode. This graphite material will now be described.

As graphite material which can be used, graphite material having true density of 2.1 g/cm$^3$ or more is preferable, and graphite material having true density of 2.18 g/cm$^3$ or more is more preferable. In order to obtain such a true density, it is preferable that (002) spacing obtained by the X-ray diffraction method is less than 0.340 nm. More preferably, it is necessary that the (002) spacing satisfies the range from 0.335 nm to 0.337 nm and the C-axis crystalline element thickness of the (002) plane is 14.0 nm or more.

Moreover, by using graphite material having bulk density of 0.4 g/cm$^3$ or more by the method described in the JISK-1469, longer cycle life time can be obtained. The anode constituted by using graphite material having bulk density of 0.4 g/cm$^3$ or more has satisfactory electrode structure. Thus, there results less peeling off (separation) or slipping off of graphite material from the anode mix layer. In this case, graphite material having bulk density of 0.5 g/cm$^3$ or more is preferable, and graphite material having 0.6 g/cm$^3$ or more is more preferable.

In order to elongate the cycle life time, it is desirable to use, as graphite material, powder in which bulk density which is caused to fall within the above-mentioned range and average value of shape parameters indicated by the following formula (1) is 125 or less.

$$X=(W/T)\times(L/T) \quad (1)$$

where

X: shape parameter,

T: thickness of the thinnest portion in thickness of powder,

L: length in the long axis direction of powder, and

W: length in the direction perpendicular to the long axis of powder

Figure 1:
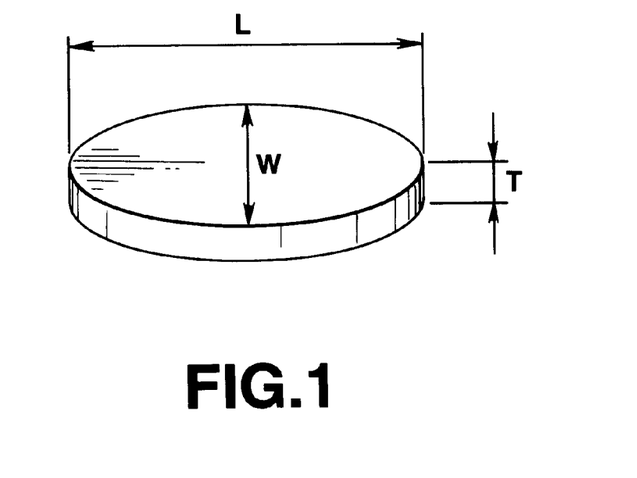
FIG. 1 is a first example of representative shape of graphite material powder.
Figure 2:
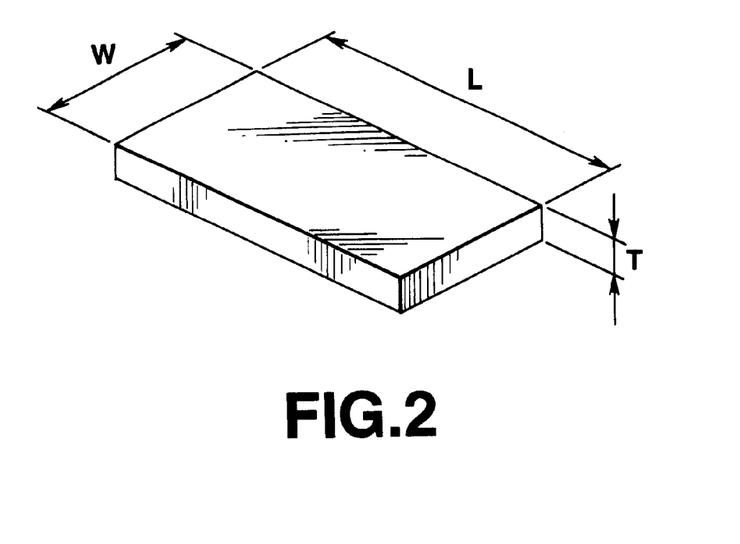
FIG. 2 is a second example of representative shape of graphite material powder.

Namely, powder shape of graphite material is flat columnar or parallelepiped shape shown in FIGS. 1 and 2. When thickness of the thinnest portion in thickness of this graphite material powder is designated at T, length of the longest portion thereof is designated at L and length in the direction perpendicular to this portion is designated at W, product of values obtained by respectively dividing L and W by T is shape parameter X. This shape parameter X means that according as its value becomes smaller, height with respect to the bottom area becomes high and the degree of flatness becomes smaller.

The anode constituted by using graphite material powder in which the bulk density is caused to fall within the above-mentioned range and average value of shape parameters X determined in this way (hereinafter referred to as "average shape parameter Xave.") is 125 or less has further satisfactory electrode structure because degree of flatness of graphite material is low so that the cycle characteristic of longer life time can be obtained. If average shape parameter Xave. of graphite material powder is 125 or less, the above-mentioned effect can be obtained. In this case, preferably, the average shape parameter Xave. is caused to fall within the range from 2 to 115. More preferably, the average shape parameter Xave. is caused to fall within the range from 2 to 100.

Moreover, in the case where there is used powder of graphite material in which the bulk density and the average shape parameter Xave. are caused to respectively fall within the above-mentioned ranges and the specific surface area determined by the nitrogen absorption BET method is 9 m$^2$/g or less, longer cycle life time can be obtained. This is because it is considered that very small (micro) particles of sub micron attached to graphite particles affect lowering of the bulk density. Since the specific surface area is increased in the case where very small particles are attached, there is no influence of very small particles when graphite powder having small specific surface area is used even in the case of similar grain size. Thus, high bulk density can be obtained. As a result, the cycle characteristic is improved. While if the specific surface area of graphite powder is 9 m$^2$/g or less, the above-mentioned effect can be sufficiently obtained, that specific surface area is preferably 7 m$^2$/g or less, and is more preferably 5 m$^2$/g or less.

Further, in order to obtain high safety and reliability as practical battery, it is desirable to use, in the grain size distribution determined by the laser diffraction method, accumulated 10% particle diameter is 3 µm or more, accumulated 50% particle diameter is 10 µm or more, and accumulated 90% particle diameter is 70 µm or less.

Graphite powder filled into the electrode can be efficiently filled when the grain size distribution is caused to have width. In this case, grain size distribution close to the normal distribution is preferable. It is to be noted that there are instances where the battery may be heated in the abnormal state such as excessive charging, etc. In the case where there is employed distribution in which there exist a large number of particles having small grain diameter, the exothermic temperature has a tendency to become high. This is not preferable.

Moreover, in charging the battery, since lithium ions are inserted into the portion between graphite layers, crystalline elements are swollen by about 10% to press the cathode and/or the separator within the battery, resulting in the state where initial failure such as internal short, etc. is apt to take place at the time of initial charging. In this case, in the case where there is employed a distribution such that a large number of particles having large grain diameter exist, occurrence percentage of failure has a tendency to become high. This is not preferable.

Accordingly, by using graphite powder having grain size distribution in which various particles including particles having large particle diameter to particles having small particle diameter are distributed in a well-balanced manner, practical battery having high reliability can be realized. While graphite powder can be efficiently filled when shape of the grain size distribution is close to the normal distribution, it is desirable to use graphite powder such that, in the grain size distribution determined by the laser diffraction method, the accumulated 10% particle diameter is 3 µm or more, the accommodated 50% particle diameter is 10 µm or more, and the accumulated 90% particle diameter is 70 µm or less. Particularly, in the case where the accumulated 90% particle diameter is 60 µm or less, initial failure is greatly reduced.

Moreover, in order to improve heavy load characteristic as the practical battery, it is desirable that the average value of breakage strength values of graphite particles is 6.0 kgf/mm$^2$ or more. Easiness of movement of ions at the time of discharge affects the load characteristic. Particularly, in the case where a large number of vacancies (holes) exist in the electrode, sufficient quantity of electrolytic solution exists. Accordingly, satisfactory characteristic is exhibited.

On the other hand, graphite material having high crystallinity is adapted so that the graphite hexagonal net surfaces are developed in the a-axis direction, and crystalline elements of the c-axis are constituted by stacking thereof. In this case, since coupling between carbon hexagonal net surfaces is weak coupling called Van der Waals force, deformation is apt to take place with respect to stress. For this reason, in compression-molding particles of graphite powder to fill them into the electrode, they are easy to be collapsed as compared to carbonaceous material baked at low temperature. As a result, it is difficult to ensure vacancies. Accordingly, by using graphite powder particles having high breakage strength, particles are difficult to be collapsed, and vacancies (holes) are thus easy to be produced. For this reason, the load characteristic can be improved.

If there is employed graphite material having crystallinity, true density, bult density, shape parameter X, specific surface area, grain size distribution and particle breakage strength as described above, either natural graphite or artificial graphite obtained by carbonizing organic material to allow the carbonized organic material thus obtained to further undergo high temperature treatment as previously described may be used as the graphite material.

The manufacturing method for artificial graphite is as previously described. The graphite carbon thus obtained is used as anode material after undergone crushing/milling. This crushing may be carried out at either process step of before and after carbonization or calcination, or temperature elevation process before graphitization. Finally, heat treatment for graphitization is carried out in the powder state. Further, in order to obtain graphite material powder having high bulk density and high breakage strength, it is desirable to allow carbon material molded body to undergo heat treatment to allow the graphitized molded body by graphitization to undergo crushing/milling thereof.

The graphitized molded body generally consists of coke serving as filler and binder pitch as molding agent or sintering agent. Namely, coke and binder pitch are mixed and molded thereafter to carbonize binder pitch thereafter to impregnate pitch thereinto. The article thus obtained is carbonized and is further graphitized. Thus, the graphitized molded body is obtained. Moreover, material in which molding ability and sintering ability are rendered to filler itself may be used to obtain similar graphitized molded body. The graphitized molded body is caused to undergo crushing/milling after heat treatment. The article thus obtained is used as anode material. In this case, since hardness of the molded body itself is high, material having high bulk density and high breakage strength can be easily obtained as crushed powder.

Moreover, since the graphitized molded body consists of coke serving as filler and binder pitch, it is caused to be polycrystalline body after graphitization and this article includes element such as sulfur or nitrogen, etc. as material. Such elements are diverged in the gas state at the time of heat treatment. As a result, passage for that gas is caused to be micro hole thus to hasten development of doping/undoping reaction of lithium of anode material. Further, the processing efficiency is advantageously high from an industrial point of view.

As anode material of this invention, metal oxide may be used along with the above-described carbon material. As the metal oxide, oxide including transition metal is suitable. Crystal compound mainly containing iron oxide, ruthenium oxide, molybdenum oxide, tungsten oxide, titanium oxide or tin oxide, etc., or amorphous compound can be utilized as anode. Particularly, compound having charge/discharge potential close to metal lithium is desirous.

Moreover, although cathode material used in this invention is not particularly limited, it is preferable that cathode material includes sufficient quantity of Li. For example, composite metal oxide consisting of lithium and transition metal represented by the general expression LiMO$_2$ (M indicates at least one kind of Co, Ni, Mn, Fe, Al, V, Ti), and interlayer compound including Li, etc. are suitable.

Particularly, since this invention aims at attaining high capacity, it is preferable that the cathode includes Li corresponding to charge/discharge capacitance of 250 mAh or more per anode carbonaceous material 1 g in the steady state (e.g., after five times of charge/discharge operations are repeated). It is more preferable to include Li corresponding to charge/discharge capacitance of 300 mAh or more.

In this case, it is not necessarily required that Li ions are delivered from the cathode material, but it is sufficient that there essentially exists Li corresponding to charge/discharge capacitance of 250 mAh or more per carbonaceous material 1 g within the battery. In addition, quantity of this Li is assumed to be judged by measuring discharge capacity of the battery.

In the non-aqueous electrolytic solution used in the non-aqueous electrolyte secondary battery of this invention, non-aqueous electrolytic solution in which electrolyte is dissolved in non-aqueous solvent is used as electrolytic solution. Although as the non-aqueous solvent in which electrolyte is dissolved, it is the premise that solvent having relatively high dielectric constant such as ethylene carbonate (EC), etc. is used as the main solvent, it is necessary to further add low viscosity solvent of plural components in order to complete this invention.

As high dielectric constant solvent, propylene carbonate (PC), butylene carbonate, vinylene carbonate, sulforan or the like, butyrolactone or the like and valerolactone or the like are suitable. As low viscosity solvent, symmetrical or asymmetrical chain ester carbonate such as dimethyl carbonate, dimethyl carbonate, methyethyl carbonate or methyl propyl carbonate, etc. are suitable. Further, also when two kinds of esters or more may be used in mixed state, satisfactory result can be obtained. Particularly, in the case where graphite material is used as anode, ethylene carbonate (EC) is mentioned as solvent suitable as non-aqueous solvent. In addition, compound of the structure in which hydrogen atoms of ethylene carbonate (EC) are replaced by halogen elements are also suitable.

Moreover, while reactive with graphite material as in the case of propylene carbonate (PC), very small quantity of ethylene carbonate (EC) as the main solvent, or compound, etc. in which hydrogen atoms of ethylene carbonate (EC) are replaced by halogen elements is replaced by the second component solvent. Thus, satisfactory characteristic can be obtained. As the second component solvent, there can be used propylene carbonate (PC), butylene carbonate, 1,2-dimethoxy ethane, 1,2-diethoxy methane, γ-butyro lactone, valerolactone, tetrahydrofuran, 2-methyltetrahydrofuran, 1,3-dioxolan, 4-metyl-1,3-dioxolan, sulfolane, methyl sulfolane, etc. It is preferable that quantity of addition thereof is less than 10% by volume.

As solvent dissolved in such a non-aqueous solution, any solvents used in the battery of this kind may be used and two kinds thereof may be used in mixed state. For example, $LiPF_6$ is suitable. In addition, $LiClO_4$, $LiAsF_6$, $LiBF_4$, $LiB(C_6H_5)_4$, $CH_3SO_3Li$, $CF_3SO_3Li$, $LiN(CF_3SO_2)$, $LiC(CF_3SO_2)_3$, LiCl, LiBr, etc. can be also used.

Method of measuring the bulk density, the average shape parameter Xave and the average particle breakage strength will now be described.

Initially, measurement of the bulk density is carried out by the method described in JISK-1469.

Namely, measuring cylinder of volume of 100 cm³ of which mass has been measured in advance is inclined to gradually throw sample powder of 100 cm³ thereinto. Then, the entire mass is measured by the minimum scale of 0.1 g to subtract the mass of the measuring cylinder from that mass to thereby determine mass of the sample powder.

Then, cork stopper is put with respect to the measuring cylinder in which sample powder has been thrown to fall the measuring cylinder in that state from height of about 5 cm with respect to the rubber plate. As a result, the sample powder within the measuring cylinder is compressed. Accordingly, volume V of the compressed sample powder is read to calculate bulk density (g/cm³) by the following formula (2)

$$D=W/V \qquad (2)$$

where

D is bulk density (g/cm³)

W is mass (g) of the sample powder within the measuring cylinder, and

V is volume (cm³) of the sample powder within the measuring cylinder after 50 times of falling operations The method of measuring the average shape parameter Xave. will be described below.

Representative shape of graphite material powder is flat columnar shape or parallelepiped shape as shown in FIGS. 1 and 2. When thickness of the thinnest portion in thickness of this graphite material powder is designated at T, length of the longest portion in length caused to serve as long axis is designated at L and length in the direction perpendicular to the long axis corresponding to the depth is designated at W, product of values obtained by respectively dividing L and W by T is the above-mentioned shape parameter X. In practice, graphite material powder is observed by using SEM (Scanning type Electron Microscope) to select ten powder samples such that length of the longest portion in length is ±30% of the average particle diameter. Then, shape parameters X are calculated by the above-mentioned formula (1) with respect to respective selected ten powder samples to calculate average value thereof. This calculated average value is the above-mentioned average shape parameter Xave.

The method of measuring the average particle breakage strength will now be described.

As measurement device for breakage strength, Shimazu Very Small Compression Tester (MCTM-500) by Shimazu Seisaku Sho is used. Initially, graphite material powder was observed by the optical microscope to select ten powder samples such that length of the longest portion in length is ±10% of the average particle diameter. Then, weight is applied to respective selected ten powder samples to measure breakage strength values of particles to calculate its average value. This calculated average value is caused to be average particle breakage strength of graphite material powder samples.

This invention will now be described below in accordance with the experimental results.

Figure 3:
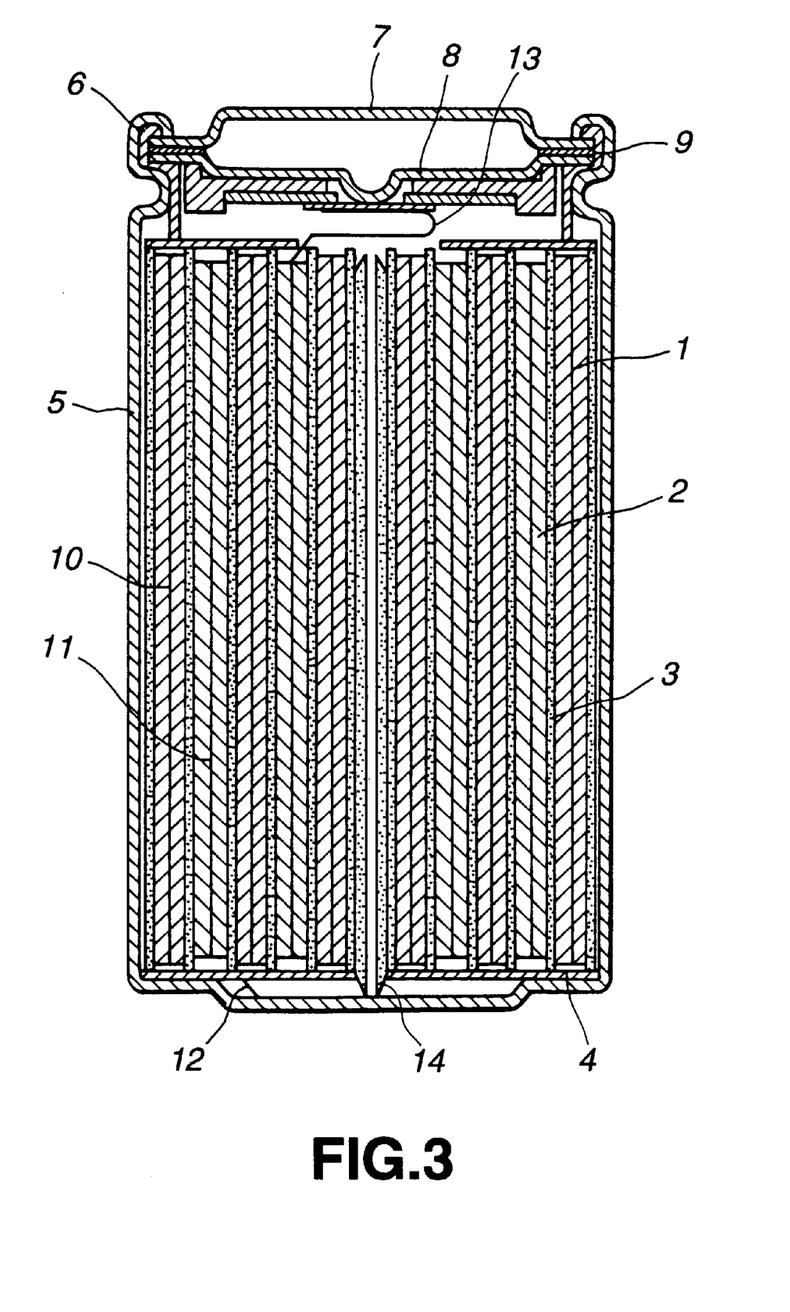
FIG. 3 is a side cross sectional view of a tubular battery according to this invention.

Initially, lithium cobalt oxide was used as cathode and lithium titanium oxide was used as anode to make up a battery as shown in FIG. 3 to allow total conductive agent quantities added to the cathode and the anode to be respectively 10% by weight to examine the effect in the case where carbon black is added, in addition to flaky graphite, as conductive agent.

In this case, a sample 1 in which only carbon black is added as conductive agent without adding flaky graphite is prepared as object to be compared.

Sample 1

Initially, anode 1 was made up in a manner as described below.

Anatase type titanium dioxide of 4 mol and lithium hydroxide of 5 mol were mixed to further add water thereto to carry out wet mixing thereof. This mixture was dried for ten (10) hours at temperature of 120° C. in air thereafter to crush white solid thus obtained to bake the crushed white solid for ten (10) hours at temperature of 800 to 900° C. in oxygen. X-ray diffraction measurement was carried out in connection with $Li_{1.33}Ti_{1.67}O_4$ to compare it with data of JCPDS file to carry out identification.

This $Li_{1.33}Ti_{1.67}O_4$ was crushed to allow it to be $Li_{1.33}Ti_{1.67}O_4$ powder in which the accumulated 50% particle diameter obtained by the laser analysis method is 5 μm. 10 weight part of acetylene black (particle diameter 30 nm) as conductive agent and 3 weight part of polyvinylidene fluoride as binding agent were mixed with respect to 91 weight part of this $Li_{1.33}Ti_{1.67}O_4$ power to prepare anode mix to disperse the anode mix thus prepared into N-methyl pyrolidone serving as solvent to allow it to be slurry in paste state.

Then, copper foil in belt form having thickness of 10 μm was used as anode collector 10 to coat anode mix slurry on both surfaces of the anode collector 10 to dry it thereafter to carry out compression-molding thereof at constant pressure to make up anode 1 in belt form.

Cathode 2 was made up in a manner as described below.

Initially, lithium carbonate of 0.5 mol and cobalt carbonate of 1 mol were mixed to bake this mixture for five (5) hours at temperature 900° C. in air to obtain active cathode material. As the result of the fact that X-ray diffraction measurement was conducted in connection with the material thus obtained, peak of this material was satisfactorily in correspondence with peak of $LiCoO_2$ registered in the JCPDS file.

This $LiCoO_2$ was crushed to allow it to be $LiCoO_2$ powder in which accumulated 50% particle diameter obtained by the laser diffraction method is 15 μm. Then, this $LiCoO_2$ powder 95 weight part and lithium carbonate powder 5 weight part were mixed to mix 87 weight part of this mixture, acetylene black 10 weight part as conductive agent and 3 weight part of polyvinylidene fluoride as binding agent to prepare cathode mix to disperse it into N-methyl pyrolidone as the solvent to allow it to be slurry in paste state.

Then, aluminum foil in belt form having thickness of 20 μm was used as cathode collector 11 to uniformly coat the cathode mix slurry on both surfaces of the cathode collector 11 to dry it thereafter to carry out compression-molding thereof to prepare cathode 2 in belt form.

Then, the anode 1 and the cathode 2 which have been made up as described above are stacked through separator 3 consisting of micro-porous polypropylene film having thickness of 25 μm in order of the anode 1, the separator 3, the cathode 2 and the separator 3 to wind it large number of times with the center pin 14 being as center thus to make up spiral electrode body of external dimension of 18 mm.

The spiral electrode body made up in this way is accommodated within a battery can 5 of steel to which nickel plating has been implemented. Then, insulating plates 4 are disposed on upper and lower both surfaces of the spiral electrode to draw cathode lead 13 of aluminum from cathode collector 11 to weld it to battery cover 7, and to draw anode lead 12 of nickel from anode collector 10 to weld it to the battery can 5.

Electrolytic solution in which $LiPF_6$ is dissolved in the ratio of 1 mol/l in equi-volumetric mixed solvent of ethylene carbonate (EC) and dimethyl carbonate (DMC) is poured into this battery can 5. Then, the battery can 5 is caulked through selealing gasket 6 of which surface is coated by asphalt to thereby fix safety valve unit 8 having current interrupting mechanism, PTC element 9 and battery cover 7 to maintain air-tightness within the battery to make up cylindrical non-aqueous electrolyte secondary battery having diameter of 18 mm and height of 65 mm.

Sample 2

Cylindrical non-aqueous electrolyte secondary battery was made up similarly to the sample 1 except that flaky graphite (trade name: KS-15; Lonza Ltd.) 10 weight part is added as conductive agent of cathode.

Sample 3

Cylindrical non-aqueous electrolyte secondary battery was made up similarly to the sample 1 except that flaky graphite (trade name: KS-15; Lonza Ltd.) 10 weight part is added as conductive agent of cathode, and flaky graphite (trade name: KS-15; Lonza Ltd.) 10 weight part is added as conductive agent of anode.

Sample 4

Cylindrical non-aqueous electrolyte secondary battery was made up similarly to the sample 1 except that flaky graphite (trade name: KS-15; Lonza Ltd.) 10 weight part is added as conductive agent of cathode, and flaky graphite (trade name: KS-15; Lonza Ltd.) 5 weight part and acetylene black 5 weight part are added as conductive agent of anode.

Sample 5

Cylindrical non-aqueous electrolyte secondary battery was made up similarly to the sample 1 except that acetylene black 10 weight part is added as conductive agent of cathode and flaky graphite (trade name: KS-15; Lonza Ltd.) 10 weight part is added as conductive agent of anode.

Sample 6

Cylindrical non-aqueous electrolyte secondary battery was made up similarly to the sample 1 except that acetylene black 10 weight part is added as conductive agent of cathode, and flaky graphite (trade name: KS-15; Lonza Ltd.) 5 weight part and acetylene black 5 weight part are added as conductive agent of anode.

Sample 7

Cylindrical non-aqueous electrolyte secondary battery was made up similarly to the sample 1 except that flaky graphite (trade name: KS-15; Lonza Ltd.) 5 weight part and acetylene black 5 weight part are added as conductive agent of cathode, and acetylene black 10 weight part is added as conductive agent of anode.

Sample 8

Cylindrical non-aqueous electrolyte secondary battery was made up similarly to the sample 1 except that flaky graphite (trade name: KS-15; Lonza Ltd.) 5 weight part and acetylene black 5 weight part are added as conductive agent of cathode, and flaky graphite (trade name: KS-15; Lonza Ltd.) 10 weight part is added as conductive agent of anode.

Sample 9

Cylindrical non-aqueous electrolyte secondary battery was made up similarly to the sample 1 except that flaky graphite (trade name: KS-15; Lonza Ltd.) 5 weight part and acetylene black 5 weight part are added as conductive agent of cathode, and flaky graphite (trade name: KS-15; Lonza Ltd.) 5 weight part and acetylene black 5 weight part are added as conductive agent of anode.

Sample 10

Cylindrical non-aqueous electrolyte secondary battery was made up similarly to the sample 1 except that flaky graphite (trade name: KS-15; Lonza Ltd.) 8 weight part and acetylene black 2 weight part are added as conductive agent of cathode, and flaky graphite (trade name: KS-15; Lonza Ltd.) 10 weight part is added as conductive agent of anode.

Sample 11

Cylindrical non-aqueous electrolyte secondary battery was made up similarly to the sample 1 except that flaky graphite (trade name: KS-15; Lonza Ltd.) 3 weight part and acetylene 7 weight part are added as conductive agent of cathode, and flaky graphite (trade name: KS-15; Lonza Ltd.) 10 weight part is added as conductive agent of anode.

Characteristic Evaluation

The cylindrical non-aqueous electrolyte secondary batteries made up as the samples 1 to 11 were used to repeatedly carry out charge/discharge cycle to determine, as capacity maintenance ratio, ratio of capacity of the 100-th cycle with respect to capacity of the 2-nd cycle. As the cycle test, at environmental temperature of 25° C., charge operation was carried out for 2.5 hours under the condition of maximum charge voltage of 4.2 V and charge current of 1A, and discharge operation was conducted until voltage falls down to 2.75 V under the condition of constant current of 1.5 A. Its result is shown in Table 1.

TABLE 1

| | CATHODE CONDUCTIVE AGENT COMPOSITION [WEIGHT %] | | | | ANODE CONDUCTIVE AGENT COMPOSITION [WEIGHT %] | | | | 2-ND CYCLE CAPACITY [mAh] | CAPACITY MAINTENANCE RATIO [%] |
|---|---|---|---|---|---|---|---|---|---|---|
| | TOTAL | GRAPHITE IN SCALE FORM | GRANULATED CARBON | CARBON BLACK | TOTAL | GRAPHITE IN SCALE FORM | GRANULATED CARBON | CARBON BLACK | | |
| SAMPLE 1 | 10 | 0 | 0 | 10 | 10 | 0 | 0 | 10 | 1158 | 63 |
| SAMPLE 2 | 10 | 10 | 0 | 0 | 10 | 0 | 0 | 10 | 1165 | 68 |
| SAMPLE 3 | 10 | 10 | 0 | 0 | 10 | 10 | 0 | 0 | 1172 | 70 |
| SAMPLE 4 | 10 | 10 | 0 | 0 | 10 | 5 | 0 | 5 | 1169 | 71 |
| SAMPLE 5 | 10 | 0 | 0 | 10 | 10 | 10 | 0 | 0 | 1163 | 66 |
| SAMPLE 6 | 10 | 0 | 0 | 10 | 10 | 5 | 0 | 5 | 1169 | 65 |
| SAMPLE 7 | 10 | 5 | 0 | 5 | 10 | 0 | 0 | 10 | 1169 | 78 |
| SAMPLE 8 | 10 | 5 | 0 | 5 | 10 | 10 | 0 | 0 | 1171 | 82 |
| SAMPLE 9 | 10 | 5 | 0 | 5 | 10 | 5 | 0 | 5 | 1175 | 88 |
| SAMPLE 10 | 10 | 8 | 0 | 2 | 10 | 10 | 0 | 0 | 1170 | 73 |
| SAMPLE 11 | 10 | 3 | 0 | 7 | 10 | 10 | 0 | 0 | 1165 | 70 |

It is seen from the result of the Table 1 that the capacity maintenance ratios of the batteries made up as the samples 2 to 11 are excellent as compared to the sample 1, and that flaky graphite is added as the conductive agent, whereby the cycle characteristic can be improved.

Further, carbon black (acetylene black) is added, in addition to the flaky graphite, as the conductive agent, whereby further excellent capacity maintenance ratio can be obtained.

Then, lithium cobalt oxide was used as cathode and lithium titanium oxide was used as anode to make up a battery as shown in FIG. 3 to examine the relationship between total conductive agent quantities (flaky graphite and carbon black) added to the cathode and the anode and the capacity maintenance ratio.

Sample 12

Cylindrical non-aqueous electrolyte secondary battery was made up similarly to the sample 7 except that flaky graphite (trade name: KS-15; Lonza Ltd.) 3 weight part and acetylene black 3 weight part are added as conductive agent with respect to mixture 91 weight part of LiCoO$_2$ powder 95 weight part and lithium carbonate powder 5 weight part as composition of cathode mix.

Sample 13

Cylindrical non-aqueous electrolyte secondary battery was made up similarly to the sample 7 except that flaky graphite (trade name: KS-15; Lonza Ltd.) 2 weight part and acetylene black 2 weight part are added as conductive agent with respect to mixture 93 weight part of LiCoO$_2$ powder 95 weight part and lithium carbonate powder 5 weight part as composition of cathode mix.

Sample 14

Cylindrical non-aqueous electrolyte secondary battery was made up similarly to the sample 7 except that flaky graphite (trade name: KS-1S; Lonza Ltd.) 1 weight part and acetylene black 1 weight part are added as the conductive agent with respect to mixture 95 weight part of LiCoO$_2$ powder 95 weight part and lithium carbonate powder 5 weight part as composition of cathode mix.

Sample 15

Cylindrical non-aqueous electrolyte secondary battery was made up similarly to the sample 7 except that flaky graphite (trade name: KS-15; Lonza Ltd.) 0.5 weight part and acetylene black 0.5 weight part are added as the conductive agent with respect to mixture 96 weight part of LiCoO$_2$ powder 95 weight part and lithium carbonate powder 5 weight part as composition of cathode mix.

Sample 16

Cylindrical non-aqueous electrolyte secondary battery was made up similarly to the sample 7 except that flaky graphite (trade name: KS-15; Lonza Ltd.) 0.1 weight part and acetylene black 0.1 weight part are added as the conductive agent with respect to mixture 96.8 weight part of LiCoO$_2$ powder 95 weight part and lithium carbonate powder 5 weight part as composition of cathode mix.

Characteristic Evaluation

Cylindrical non-aqueous electrolyte secondary batteries made up as the samples 12 to 16 were used to repeatedly carry out the charge/discharge cycle under the same condition as that of the cycle test carried out at the sample 7 to determine, as capacity maintenance ratio, ratio of capacity of the 100-th cycle with respect to capacity of the second cycle. Its result is shown in Table 2.

TABLE 2

| | CATHODE CONDUCTIVE AGENT COMPOSITION [WEIGHT %] | | | | ANODE CONDUCTIVE AGENT COMPOSITION [WEIGHT %] | | | | 2-ND CYCLE CAPACITY [mAh] | CAPACITY MAINTENANCE RATIO [%] |
|---|---|---|---|---|---|---|---|---|---|---|
| | TOTAL | GRAPHITE IN SCALE FORM | GRANULAT- ED CARBON | CARBON BLACK | TOTAL | GRAPHITE IN SCALE FORM | GRANULAT- ED CARBON | CARBON BLACK | | |
| SAMPLE 7 | 10 | 5 | 0 | 5 | 10 | 0 | 0 | 10 | 1169 | 78 |
| SAMPLE 12 | 6 | 3 | 0 | 3 | 10 | 0 | 0 | 10 | 1178 | 78 |
| SAMPLE 13 | 4 | 2 | 0 | 2 | 10 | 0 | 0 | 10 | 1185 | 79 |
| SAMPLE 14 | 2 | 1 | 0 | 1 | 10 | 0 | 0 | 10 | 1190 | 81 |
| SAMPLE 15 | 1 | 0.5 | 0 | 0.5 | 10 | 0 | 0 | 10 | 1191 | 70 |
| SAMPLE 16 | 0.2 | 0.1 | 0 | 0.1 | 10 | 0 | 0 | 10 | 1192 | 63 |

It is seen from the result of the Table 2 that excellent capacity maintenance ratio can be obtained within the range where total conductive agent quantity at the cathode is above 0.3 weight part. It is seen that, particularly within the range where the total conductive agent quantity is above 1.0% by weight, excellent capacity maintenance ratio can be obtained.

Then, lithium cobalt oxide was used as the cathode and lithium titanium oxide was used as anode to make up a battery as shown in FIG. 3 to examine the influence by difference between particle diameters of carbon black materials added to the cathode and the anode.

Sample 17

Cylindrical non-aqueous electrolyte secondary buttery was made up similarly to the sample 14 except that the particle diameter of acetylene black as the conductive agent of the cathode is set to 25 μm.

Sample 18

Cylindrical non-aqueous electrolyte secondary battery was made up similarly to the sample 14 except that the particle diameter of acetylene black as the conductive agent of the cathode is set to 19 μm.

Sample 19

Cylindrical non-aqueous electrolyte secondary battery was made up similarly to the sample 14 except that the particle diameter of acetylene black as the conductive agent of the cathode is set to 13 μm.

Sample 20

Cylindrical non-aqueous electrolyte secondary battery was made up similarly to the sample 14 except that the particle diameter of acetylene black as the conductive agent of the cathode is set to 40 μm.

Sample 21

Cylindrical non-aqueous electrolyte secondary battery was made up similarly to the sample 14 except that the particle diameter of acetylene black as the conductive agent of the cathode is set to 48 μm.

Sample 22

Cylindrical non-aqueous electrolyte secondary battery was made up similarly to the sample 14 except that the particle diameter of acetylene black as the conductive agent of the cathode is set to 75

Characteristic Evaluation

The cylindrical non-aqueous electrolyte secondary batteries made up as the samples 17 to 22 were used to repeatedly carry out the charge/discharge cycle under the same condition as that of the cycle test carried out at the sample 14 to determine ratio of capacity of the 100-th cycle with respect to capacity of the second cycle as the capacity maintenance ratio. Its result is shown in Table 3.

TABLE 3

| | CATHODE CONDUCTIVE AGENT COMPOSITION [WEIGHT %] | | | | ANODE CONDUCTIVE AGENT COMPOSITION [WEIGHT %] | | | | 2-ND CYCLE CAPACITY [mAh] | CAPACITY MAINTE- NANCE RATIO [%] | GRAIN SIZE OF CARBON BLACK [nm] |
|---|---|---|---|---|---|---|---|---|---|---|---|
| | TO- TAL | GRAPHITE IN SCALE FORM | GRANULAT- ED CARBON | CARBON BLACK | TOTAL | GRAPHITE IN SCALE FORM | GRANULAT- ED CARBON | CARBON BLACK | | | |
| SAMPLE 14 | 2 | 1 | 0 | 1 | 10 | 0 | 0 | 10 | 1190 | 81 | 30 |
| SAMPLE 17 | 2 | 1 | 0 | 1 | 10 | 0 | 0 | 10 | 1193 | 82 | 25 |
| SAMPLE 18 | 2 | 1 | 0 | 1 | 10 | 0 | 0 | 10 | 1195 | 83 | 19 |
| SAMPLE 19 | 2 | 1 | 0 | 1 | 10 | 0 | 0 | 10 | 1196 | 85 | 13 |

TABLE 3-continued

| | CATHODE CONDUCTIVE AGENT COMPOSITION [WEIGHT %] | | | | ANODE CONDUCTIVE AGENT COMPOSITION [WEIGHT %] | | | | 2-ND CYCLE CAPAC-ITY [mAh] | CAPACITY MAINTE-NANCE RATIO [%] | GRAIN SIZE OF CARBON BLACK [nm] |
|---|---|---|---|---|---|---|---|---|---|---|---|
| | TO-TAL | GRAPHITE IN SCALE FORM | GRANULAT-ED CARBON | CARBON BLACK | TOTAL | GRAPHITE IN SCALE FORM | GRANULAT-ED CARBON | CARBON BLACK | | | |
| SAMPLE 20 | 2 | 1 | 0 | 1 | 10 | 0 | 0 | 10 | 1190 | 78 | 40 |
| SAMPLE 21 | 2 | 1 | 0 | 1 | 10 | 0 | 0 | 10 | 1190 | 73 | 48 |
| SAMPLE 22 | 2 | 1 | 0 | 1 | 10 | 0 | 0 | 10 | 1189 | 72 | 75 |

It is seen from the result of the Table 3 that the particle diameter of carbon black added as the conductive agent is preferably 75 nm or less, and excellent capacity maintenance ratio can be obtained particularly within the range from 10 to 40 nm.

Then, lithium cobalt oxide was used as cathode and carbonaceous material was used as anode to make up a battery as shown in FIG. 3 to allow total conductive agent quantities added to the cathode and the anode to be respectively 10% by weight to examine the effect in the case where carbon black/granulated carbon is added, in addition to flaky graphite, as the conductive agent.

In this case, sample 23 in which only granulated carbon is added, without adding flaky graphite, as the conductive agent is prepared as object to be compared.

Sample 23

Anode 1 was made up in a manner as described below.

30 weight part of coal tar system pitch serving as binder was added to coal system coke 100 weight part serving as filler to mix them at about 100° C. thereafter to carry out compression-molding thereof by the press to obtain precursor of carbon molded body. Bin der pitch fused at 200° C. or less is further impregnated into carbon material molded body obtained by heat-treating this precursor at 1000° C. or less to repeat, several times, process steps of pitch impregnation and baking which carry out heat treatment at 1000° C. or less. Thereafter, this carbon molded body is caused to undergo heat treatment at 2700° C. in the atmosphere of inactive gas to obtain carbonized molded body thereafter to carry out crushing/milling thereof to make up sample powder.

As the result of the fact that X-ray diffraction measurement was carried out in connection with the graphite material obtained at this time, spacing of the (002) plane was 0.337 nm, the C-axis crystalline element thickness of the (002) plane was 50.0 nm, true density by the pycnometer method was 2.23, bulk density was 0.83 g/cm³, the average shape parameter Xave. was 10, the specific surface area by the BET method was 4.4 m²/g, grain size distribution by the laser diffraction method was such that the average particle diameter is 31.2 μm, the accumulated 10% particle diameter is 12.3 μm, the accumulated 50% particle diameter is 29.5 μm and the accumulated 90% particle diameter is 53.7 um, and the average value of breakage strength values of graphite particles is 7.1 kgf/mm².

Then, the material made up in this way (sample powder) 90 weight part and polyvinyledene fluoride (PVDF) 10 weight part were mixed to prepare anode mix to disperse it into N-methylpyrolidone serving as solvent to allow it to be slurry in paste state. Copper foil in belt form having thickness of 10 μm was used as anode collector 10 to coat anode mix slurry on both surfaces of the anode collector 10 to dry it thereafter carry out compression-molding thereof at a constant pressure to make up belt-shaped anode 1.

The cathode 2 was made up in a manner as described below.

Initially, lithium carbonate of 0.5 mol and cobalt carbonate of 1 mol were mixed to bake this mixture for five (5) hours at temperature of 900° C. in air to obtain active cathode material. As the result of the fact that the X-ray diffraction measurement was conducted in connection with the material thus obtained, its peak was well in correspondence with the peak of $LiCoO_2$ registered in the JCPDS file.

This $LiCoO_2$ was crushed to allow the crushed material thus obtained to be $LiCoO_2$ powder in which accumulated 50% particle diameter obtained by the laser diffraction method is 15 μm. Then, this $LiCoO_2$ powder 95 weight part and lithium carbonate powder 5 weight part were mixed to mix 87 weight part of this mixture, pitch system granulated carbon (d002=0.337 nm, Lc=30 nm, bulk density is 0.57 g/cm³, accumulated 50% particle diameter=16 μm) 10 weight part as the conductive agent, and 3 weight part of polyvinylidene fluoride as the binding agent to prepare cathode mix to disperse the cathode mix into N-methyl pyrrolidone serving as solvent to allow it to be slurry in paste state.

Then, belt-shaped aluminum foil having thickness of 20 μm was used as cathode collector 11 to uniformly coat the cathode mix slurry on both surfaces of the cathode collector 11 to dry it to carry out compressions-molding thereof to make up belt-shaped cathode 2.

Cylindrical non-aqueous electrolyte secondary battery having diameter of 18 mm and height of 65 mm was made up similarly to the sample 1 except that the anode 1 and the cathode 2 which have been made up in a manner as described above are used.

Sample 24

Cylindrical non-aqueous electrolyte secondary battery was made up similarly to the sample 23 except that flaky graphite (trade name: KS-15; Lonza Ltd.) 10 weight part is added as the conductive agent of the cathode.

Sample 25

Cylindrical non-aqueous electrolyte secondary battery was made up similarly to the sample 23 except that flaky graphite (trade name: KS-15; Lonza Ltd.) 8 weight part and pitch system granulated carbon 2 weight part are added as the conductive agent of the cathode.

Sample 26

Cylindrical non-aqueous electrolyte secondary battery was made up similarly to the sample 23 except that flaky graphite (trade name: KS-15; Lonza Ltd.) 6 weight part and pitch system granulated carbon 4 weight part are added as the conductive agent of the cathode.

Sample 27

Cylindrical non-aqueous electrolyte secondary battery was made up similarly to the sample 23 except that flaky graphite (trade name: KS-15; Lonza Ltd.) 3 weight part and pitch system granulated carbon 7 weight part are added as the conductive agent of the cathode.

Sample 28

Cylindrical non-aqueous electrolyte secondary battery was made up similarly to the sample 23 except that flaky graphite (trade name: KS-15; Lonza Ltd.) 4.9 weight part, pitch system granulated carbon 4.9 weight part and carbon black 0.2 weight part are added as the conductive agent of the cathode.

Sample 29

Cylindrical non-aqueous electrolyte secondary battery was made up similarly to the sample 23 except that flaky graphite (trade name: KS-15; Lonza Ltd.) 4.8 weight part, pitch system granulated carbon 4.8 weight part and carbon black 0.4 weight part are added as the conductive agent of the cathode.

Sample 30

Cylindrical non-aqueous electrolyte secondary battery was made up similarly to the sample 23 except that flaky graphite (trade name: KS-15; Lonza Ltd.), pitch system granulated carbon 4.5 weight part and carbon black 1.0 weight part are added as the conductive agent of the cathode.

Sample 31

Cylindrical non-aqueous electrolyte secondary battery was made up similarly to the sample 23 except that flaky graphite (trade name: KS-15; Lonza Ltd.) 4.2 weight part, pitch system granulated carbon 4.2 weight part and carbon black 1.6 weight part are added as the conductive agent of the cathode.

Sample 32

Cylindrical non-aqueous electrolyte secondary battery was made up similarly to the sample 23 except that flaky graphite (trade name: KS-15; Lonza Ltd.) 3.5 weight part, pitch system granulated carbon 3.5 weight part and carbon black 3.0 weight part are added as the conductive agent of the cathode.

Sample 33

Cylindrical non-aqueous electrolyte secondary battery was made up similarly to the sample 23 except that flaky graphite (trade name: KS-15; Lonza Ltd.) 3.0 weight part, pitch system granulated carbon 3.0 weight part and carbon black 4.0 weight part are added as the conductive agent of the cathode.

Characteristic Evaluation

The cylindrical non-aqueous electrolyte secondary batteries made up as the samples 23 to 33 were used to repeatedly carry out charge/discharge cycle under the same condition as that of the cycle test carried out at the sample 1 to determine, as capacity maintenance ratio, ratio of capacity of the 100-th cycle with respect to 2-nd cycle. Its result is shown in Table 4 and FIGS. 4 and 5.

TABLE 4

| | CATHODE CONDUCTIVE AGENT COMPOSITION [WEIGHT %] | | | | 2-ND CYCLE CAPACITY [mAh] | CAPACITY MAINTENANCE RATIO [%] |
|---|---|---|---|---|---|---|
| | TOTAL | GRAPHITE IN SCALE FORM | GRANULATED CARBON | CARBON BLACK | | |
| SAMPLE 23 | 10 | 0 | 10 | 0 | 1498 | 76 |
| SAMPLE 24 | 10 | 10 | 0 | 0 | 1490 | 80 |
| SAMPLE 25 | 10 | 8 | 2 | 0 | 1506 | 91 |
| SAMPLE 26 | 10 | 6 | 4 | 0 | 1508 | 92 |
| SAMPLE 27 | 10 | 3 | 7 | 0 | 1502 | 89 |
| SAMPLE 28 | 10 | 4.9 | 4.9 | 0.2 | 1509 | 91 |
| SAMPLE 29 | 10 | 4.8 | 4.8 | 0.4 | 1510 | 93 |
| SAMPLE 30 | 10 | 4.5 | 4.5 | 1.0 | 1513 | 95 |
| SAMPLE 31 | 10 | 4.2 | 4.2 | 1.6 | 1508 | 93 |
| SAMPLE 32 | 10 | 3.5 | 3.5 | 3.0 | 1505 | 91 |
| SAMPLE 33 | 10 | 3 | 3 | 4 | 1500 | 85 |

Figure 4:
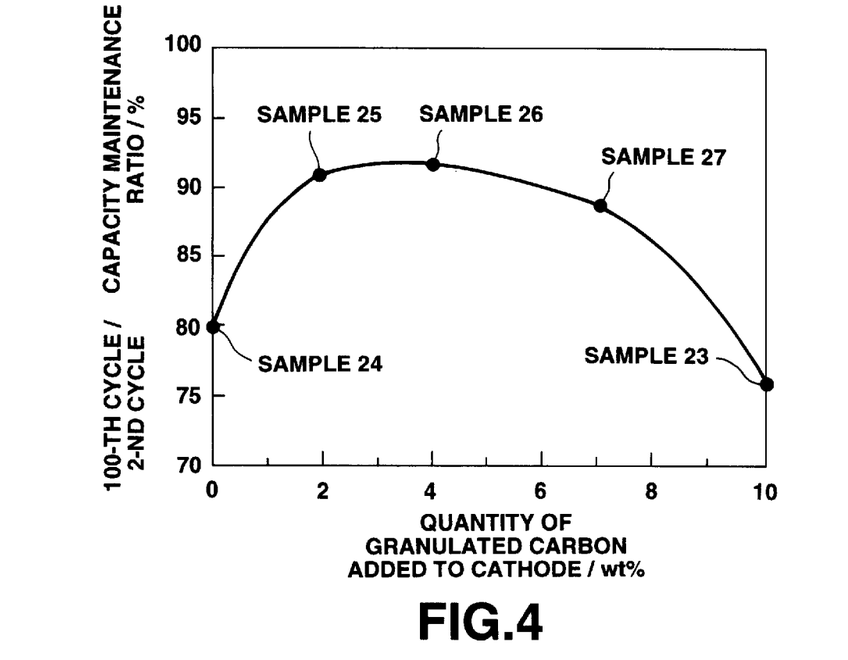
FIG. 4 is a view showing the relationship between quantity of granulated carbon added to cathode and capacity maintenance ratio.

It is seen from the result of the Table 4 and the FIG. 4 that the batteries made up as the samples 25 to 27 have excellent capacity maintenance ratio as compared to the batteries made up as the samples 23 and 24, and that granulated carbon is added in addition to the flaky graphite, whereby the cycle characteristic can be further improved.

Figure 5:
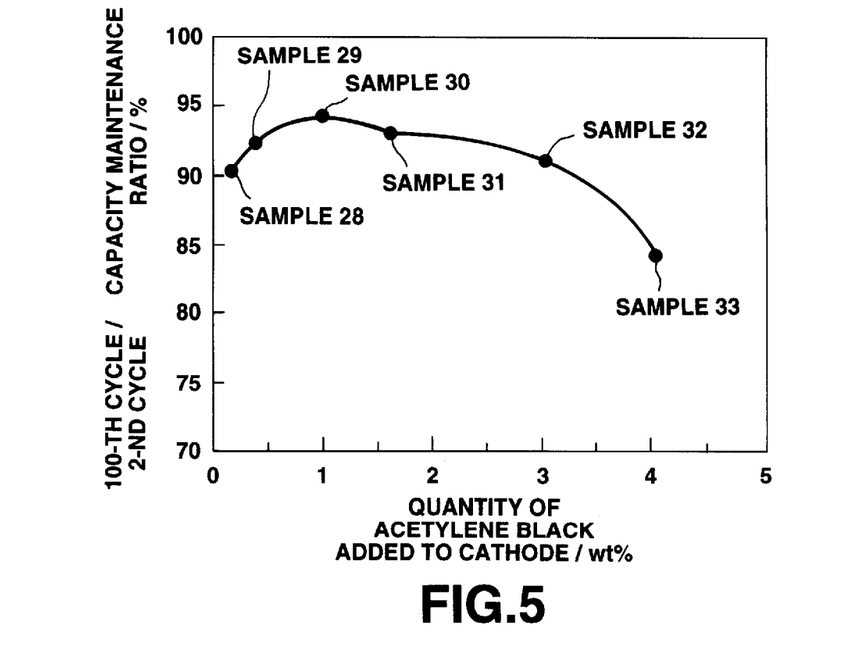
FIG. 5 is a view showing the relationship between quantity of acetylene black added to cathode and capacity maintenance ratio.

Further, it is seen from the result of the Table 4 and FIG. 5 that the batteries made up as the samples 28 to 33 have excellent capacity maintenance ratio as compared to the samples 23 and 24, and that carbon black is added in addition to the flaky graphite and the granulated carbon, whereby the cycle characteristic can be further improved.

Then, lithium cobalt oxide was used as the cathode and carbonaceous material was used as the anode to make up a battery as shown in FIG. 3 to examine the relationship between total quantity of conductive agent added to the cathode and the capacity maintenance ratio.

Sample 34

Cylindrical non-aqueous electrolyte secondary battery was made up similarly to the sample 23 except that flaky graphite (trade name: KS-15; Lonza Ltd.) 0.45 weight part, pitch system granulated carbon 0.45 weight part and acetylene black 0.1 weight part are added as the conductive agent with respect to mixture 96 weight part of $LiCoO_2$ powder 95 weight part and lithium carbonate powder 5 weight part as composition of cathode mix.

Sample 35

Cylindrical non-aqueous electrolyte secondary battery was made up similarly to the sample 23 except that flaky graphite (trade name: KS-15, Lonza Ltd.) 1.35 weight part, pitch system granulated carbon 1.35 weight part and acetylene black 0.3 weight part are added as the conductive agent with respect to mixture 94 weight part of $LiCoO_2$ powder 95 weight part and lithium carbonate powder 5 weight part as composition of the cathode mix.

Sample 36

Cylindrical non-aqueous electrolyte secondary battery was made up similarly to the sample 23 except that flaky graphite (Trade name: KS-15, Lonza Ltd.) 2.7 weight part, pitch system granulated carbon 2.7 weight part and acetylene black 0.6 weight part are added as the conductive agent with respect to mixture 91 weight part of $LiCoO_2$ powder 95 weight part and lithium carbonate powder 5 weight part as composition of cathode mix.

Sample 37

Cylindrical non-aqueous electrolyte secondary battery was made up similarly to the sample 23 except that flaky graphite (trade name: KS-15; Lonza Ltd.) 7.2 weight part, pitch system granulated carbon 7.2 weight part and acetylene black 1.6 weight part are added as the conductive agent with respect to mixture 81 weight part of $LiCoO_2$ powder 95 weight part and lithium carbonate powder 5 weight part as composition of cathode mix.

Sample 38

Cylindrical non-aqueous electrolyte secondary battery was made up similarly to the sample 23 except that flaky graphite (trade name: KS-15; Lonza Ltd.) 8.9 weight part, pitch system granulated carbon 8.9 weight part and acetylene black 2.2 weight part are added as the conductive agent with respect to mixture 75 weight part of $LiCoO_2$ powder 95 weight part and lithium carbonate powder 5 weight part as composition of cathode mix.

Characteristic Evaluation

The cylindrical non-aqueous electrolyte secondary batteries made up as the samples 34 to 38 were used to repeatedly carry out charge/discharge cycle under the same condition as that of the cycle test carried out at the sample 1 to determine, as capacity maintenance ratio, ratio of capacity of the 100-th cycle with respect to capacity of the 2-nd cycle. Its result is shown in Table 5 and FIG. 6.

alcohol 100 weight part was initially heated for five (5) hours within hot bath to obtain consistent polymer thereafter to remove remaining water and not yet reacted alcohol by vacuum distillation. Then, the furfuryl alcohol resin (PFA) thus obtained was carbonized in nitrogen dir for five (5) hours at 500° C. thereafter to heat crushed article so that its temperature rises up to 1200° C. to carry out heat treatment thereof for one (1) hour to further crush it so that carbon material powder having average particle diameter of 20 μm is provided. In this case, as the result of the fact that the X-ray diffraction measurement was carried out in connection with the non-graphitaizable carbon material thus obtained at this time, spacing of the (002) plane was 0.383 nm, true density by the pychnometer method was 1.52, and oxidation exothermic peak temperature in the differential thermal analysis in air flow was 634° C.

Cylindrical non-aqueous electrolyte secondary battery having diameter of 18 mm and height of 65 mm was made up similarly to the sample 24 except that the non-graphitaizable carbon material made up in this way is used as anode material.

Sample 40

Cylindrical non-aqueous electrolyte secondary battery was made up similarly to the sample 25 except that the anode material of the sample 39 is used.

Sample 41

Cylindrical non-aqueous electrolyte secondary battery was made up similarly to the sample 25 except that titanium oxide made up as the sample 1 is used as anode material and flaky graphite (trade name: KS-15; Lonza Ltd.) 8 weight part and granulated carbon 2 weight part are added as conductive agent of anode.

Sample 42

Cylindrical non-aqueous electrolyte secondary battery was made up similarly to the sample 25 except that titanium oxide made up as the sample 1 is used as anode material, and

TABLE 5

| | CATHODE CONDUCTIVE AGENT COMPOSITION [WEIGHT %] | | | | 2-ND CYCLE CAPACITY [mAh] | CAPACITY MAINTENANCE RATIO [%] |
|---|---|---|---|---|---|---|
| | TOTAL | GRAPHITE IN SCALE FORM | GRANULATED CARBON | CARBON BLACK | | |
| SAMPLE 34 | 1 | 0.45 | 0.45 | 0.1 | 1420 | 72 |
| SAMPLE 35 | 3 | 1.35 | 1.35 | 0.3 | 1515 | 92 |
| SAMPLE 36 | 6 | 2.7 | 2.7 | 0.6 | 1513 | 96 |
| SAMPLE 37 | 16 | 7.2 | 7.2 | 1.6 | 1495 | 88 |
| SAMPLE 38 | 22 | 8.9 | 8.9 | 2.2 | 1492 | 78 |

Figure 6:
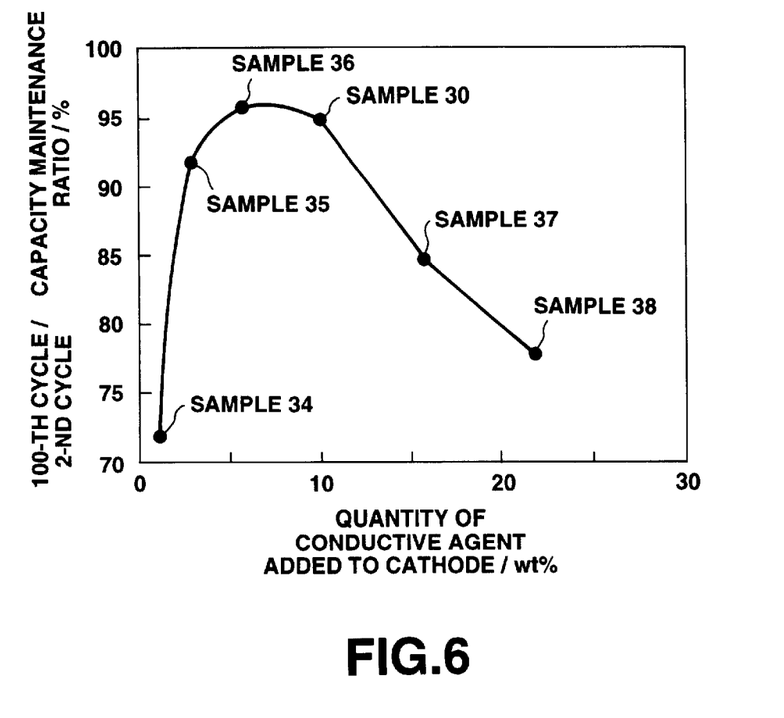
FIG. 6 is a view showing the relationship between quantity of conductive agent added to cathode and capacity maintenance ratio.

It is seen from the Table 5 and the FIG. 6 that the total quantity of conductive agent at the cathode is preferably 1.5 to 20% by weight. It is further seen that particularly excellent capacity maintenance ratio can be obtained especially within the range where the total conductive agent quantity is 2 to 16% by weight.

Then, anode material was changed to examine the effect in the case where granulated carbon and carbon black are added, in addition to flaky graphite, as the conductive agent.

Sample 39

Carbonaceous material shown below was prepared as anode material.

Mixture in which 85% phosphoric acid 0.5 weight part and water 10 weight part are mixed with respect to furfuryl granulated carbon 2.7 weight part and acetylene black 0.6 weight part are added, in addition to flaky graphite (trade name: KS-15; Lonza Ltd.) 2.7 weight part, as the conductive agent of the anode.

Characteristic Evaluation

Cylindrical non-aqueous electrolyte secondary batteries made up as the samples 39 to 42 were used to repeatedly carry out charge/discharge cycle under the same condition as that of the cycle test carried out as the sample 1 to determine, as capacity maintenance ratio, ratio of capacity of the 100-th cycle with respect to capacity of the 2-nd cycle. Its result is shown in Table 6.

TABLE 6

| | CATHODE CONDUCTIVE AGENT COMPOSITION [WEIGHT %] | | | ANODE CONDUCTIVE AGENT COMPOSITION [WEIGHT %] | | | | 2-ND CYCLE CAPACITY [mAh] | CAPACITY MAINTENANCE RATIO [%] |
|---|---|---|---|---|---|---|---|---|---|
| | TOTAL | GRAPHITE IN SCALE FORM | GRANULATED CARBON | CARBON BLACK | TOTAL | GRAPHITE IN SCALE FORM | GRANULATED CARBON | CARBON BLACK | | |
| SAMPLE 39 | 10 | 10 | 0 | 0 | — | — | — | — | 1260 | 90 |
| SAMPLE 40 | 10 | 8 | 2 | 0 | — | — | — | — | 1260 | 94 |
| SAMPLE 41 | 10 | 8 | 2 | 0 | 10 | 8 | 2 | 0 | 1170 | 85 |
| SAMPLE 42 | 10 | 8 | 2 | 0 | 6 | 2.7 | 2.7 | 0.6 | 1190 | 90 |

It is seen from the result of the Table 6 that even if, as anode material, non-graphitaizable carbon material is used or metal oxide is used, granulated carbon is added, in addition to flaky graphite, as conductive agent, whereby the capacity maintenance ratio is improved, and carbon black is further added, whereby the capacity maintenance ratio is further improved.

INDUSTRIAL APPLICABILITY

In accordance with this invention, there is employed such a scheme to allow both the anode and the cathode or either one of them to include flaky graphite having high crystallinity and high electron conductivity as the conductive agent, and to add, as conductive agent, granulated carbon having specific material property or a predetermined quantity of carbon black, whereby the granulated carbon holds electrode structure having satisfactory electron conductivity formed by flaky graphite, and the carbon black functions as electrolytic solution holding material at the active material surface, whereby non-aqueous electrolyte secondary battery having long charge/discharge cycle life time can be provided.

What is claimed is:

1. A non-aqueous electrolyte secondary battery comprising:
   an electrode body comprising a strip-shaped anode and a strip-shaped cathode, wherein an anode mix including one or more active materials capable of doping and de-doping lithium is formed on both sides of an anode collector of the strip-shaped anode, and wherein a cathode mix including one or more cathode active materials capable of doping and de-doping lithium is formed on both sides of a cathode collector of the strip-shaped cathode; and
   a non-aqueous electrolyte solution comprising an electrolyte dissolved in a non-aqueous solvent;
   wherein said anode mix and said cathode mix each comprise a conductive agent wherein the conductive agent comprises flaky graphite having a thickness of a (002) plane spacing greater than 100 nm, granulated carbon having a thickness of a (002) plane spacing of 100 nm or less, and a carbon black and wherein a weight ratio in the conductive agent between the flaky graphite and the granulated carbon with respect to the carbon black is 99:1 to 70:30;
   and wherein the total conductive agent in each of said anode mix and said cathode mix ranges from 1.5% by weight to 10% by weight.

2. The non-aqueous electrolyte secondary battery of claim 1, wherein the conductive agent ranges from 2.0% by weight to 10% by weight.

3. The non-aqueous electrolyte secondary battery of claim 1, wherein the anode active material of the anode mix consists of $LiMO_2$ wherein M is selected from the group consisting of at least one of Co, Ni, Mn, Fe, Al, V and Ti and said cathode active material of said cathode mix is at least one of a graphite material or a metal oxide.

4. The non-aqueous electrolyte secondary battery of claim 1, wherein the granulated carbon has a bulk density of at least 0.5 g/cm$^3$.

5. The non-aqueous electrolyte secondary battery of claim 1 wherein a bulk density of carbon black is 0.4 g/cm$^3$ or less.

6. The non-aqueous electrolyte secondary battery of claim 1, wherein a weight ratio in the conductive agent between the flaky graphite and the granulated carbon with respect to the carbon black ranges from 96:4 to 75:25.

* * * * *